(12) United States Patent
Chen et al.

(10) Patent No.: US 12,009,695 B2
(45) Date of Patent: Jun. 11, 2024

(54) POWER CONVERSION SYSTEM

(71) Applicant: Delta Electronics, Inc., Taoyuan (TW)

(72) Inventors: Jun Chen, Shanghai (CN); Tsu-Hua Ai, Taoyuan (TW); Changyong Wang, Shanghai (CN); Yansong Lu, Shanghai (CN); Jun Liu, Shanghai (CN)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/886,305

(22) Filed: Aug. 11, 2022

(65) Prior Publication Data

US 2023/0068452 A1 Mar. 2, 2023

(30) Foreign Application Priority Data

Aug. 25, 2021 (CN) .......................... 202110983920.X

(51) Int. Cl.
*H02J 9/06* (2006.01)
*H02J 7/00* (2006.01)
*H02J 7/04* (2006.01)

(52) U.S. Cl.
CPC ............ *H02J 9/062* (2013.01); *H02J 7/0048* (2020.01); *H02J 7/00712* (2020.01); *H02J 7/04* (2013.01)

(58) Field of Classification Search
CPC ...... H02J 9/062; H02J 7/0048; H02J 7/00712; H02J 7/04
See application file for complete search history.

(56) References Cited

U.S. PATENT DOCUMENTS

| 7,566,988 | B2* | 7/2009 | Heber | H02J 3/007 307/64 |
| 9,608,451 | B2* | 3/2017 | Sugeno | B60L 53/53 |
| 2003/0080622 | A1 | 5/2003 | Koenig | |
| 2005/0043859 | A1* | 2/2005 | Tsai | H02J 9/062 307/65 |
| 2014/0062192 | A1 | 3/2014 | Vichnyakov | |
| 2015/0035359 | A1* | 2/2015 | Chung | H02J 9/062 307/23 |
| 2015/0076916 | A1* | 3/2015 | Cheng | H02J 9/062 307/64 |

(Continued)

FOREIGN PATENT DOCUMENTS

| CN | 102723772 A | 10/2012 |
| CN | 104104136 A | 10/2014 |

(Continued)

*Primary Examiner* — Carlos Amaya
(74) *Attorney, Agent, or Firm* — KIRTON McCONKIE; Evan R. Witt

(57) ABSTRACT

A power conversion system is coupled between a power grid and a load. The power conversion system includes a battery, a first converter, a second converter and a DC/DC converter. The first converter is configured to selectively convert an input power from the power grid into a first charging power when the power grid is operated normally. The second converter is configured to convert the input power from the power grid into an output power when the power grid is operated normally. The DC/DC converter is electrically connected between the battery and the second converter. The DC/DC converter is configured to convert a storage power in the battery into a backup power when the power grid is not operated normally.

11 Claims, 5 Drawing Sheets

(56) References Cited

U.S. PATENT DOCUMENTS

2018/0262045 A1   9/2018  Ohnishi et al.
2019/0020284 A1   1/2019  Danforth et al.
2019/0280492 A1   9/2019  Haj-Maharsi et al.

FOREIGN PATENT DOCUMENTS

| CN | 106410952 B  | 7/2017 |
| CN | 107017696 A  | 8/2017 |
| CN | 111181240 A  | 5/2020 |
| TW | 200419884 A  | 10/2004 |
| TW | 201004110 A  | 1/2010 |

* cited by examiner

POWER CONVERSION SYSTEM

CROSS-REFERENCE TO RELATED APPLICATION

This application claims priority to China Patent Application No. 202110983920.X, filed on Aug. 25, 2021, the entire contents of which are incorporated herein by reference for all purposes.

FIELD OF THE INVENTION

The present disclosure relates to a power conversion system, and more particularly to a power conversion system with a single battery shared between an uninterrupted power system and an energy storage system.

BACKGROUND OF THE INVENTION

Due to the development of the semiconductor industry, an energy storage system such as a power conditioning system (PCS) is gradually used in semiconductor fabrication plants that consume a lot of electric energy. In addition, the semiconductor fabrication plant is usually equipped with an uninterrupted power system (UPS) for the critical loads.

FIG. 1 is a schematic circuit block diagram illustrating a conventional power conversion system. As shown in FIG. 1, a conventional power conversion system 1' includes an energy storage system 2' and an uninterrupted power system (UPS) 4'. The energy storage system 2' includes an energy storage converter 21' and an energy storage battery 22'. The energy storage converter 21' is connected with a power grid 3'. The energy storage battery 22' receives and stores the electric power from the power grid 3'. Moreover, the electric energy stored in the energy storage battery 22' can be fed back to the power grid 3'. The uninterrupted power system 4' includes a UPS converter 41' and a UPS battery 42'. The UPS converter 41' is connected between the power grid 3' and a load L'. When the power grid 3' is operated normally, the load L' is powered by the power grid 3'. When the power 3' is not operated normally, the load L' is powered by the UPS battery 42' of the uninterrupted power system 4'.

However, the conventional power conversion system 1' with the energy storage system 2' and the uninterrupted power system 4' still has some drawbacks. For example, the two batteries of the energy storage system 2' and the uninterrupted power system 4' are operated independently. As known, the price of the battery is high. After a certain use life, the battery needs to be replaced with a new one. In other words, the equipment cost and the maintenance cost of the conventional power conversion system are very high.

Therefore, there is a need of providing an improved power conversion system in order to address the drawbacks of the conventional technologies.

SUMMARY OF THE INVENTION

The present disclosure provides a power conversion system with reduced cost.

In accordance with an aspect of present disclosure, a power conversion system is provided. The power conversion system is coupled between a power grid and a load. The power conversion system includes a battery, a first converter, a second converter and a DC/DC converter. The first converter is electrically connected between the power grid and the battery. The first converter is configured to selectively convert an input power from the power grid into a first charging power when the power grid is operated normally. The second converter is electrically connected between the power grid and the load. The second converter is configured to convert the input power from the power grid into an output power when the power grid is operated normally. The DC/DC converter is electrically connected between the battery and the second converter. The DC/DC converter is configured to convert a storage power in the battery into a backup power when the power grid is not operated normally.

In accordance with another aspect of present disclosure, a power conversion system is provided. The power conversion system is coupled between a first power grid, a second power grid and a load. The power conversion system includes a battery, a first converter and a second converter. The first converter is electrically connected between the first power grid and the battery. The first converter is configured to selectively convert a first input power from the first power grid into a first charging power when the first power grid is operated normally. The second converter is electrically connected between the second power grid and the load. The second converter is configured to convert a second input power from the second power grid into an output power when the second power grid is operated normally. The battery is electrically coupled with the second converter. A backup power from the battery is converted into the output power by the second converter when the second power grid is not operated normally.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
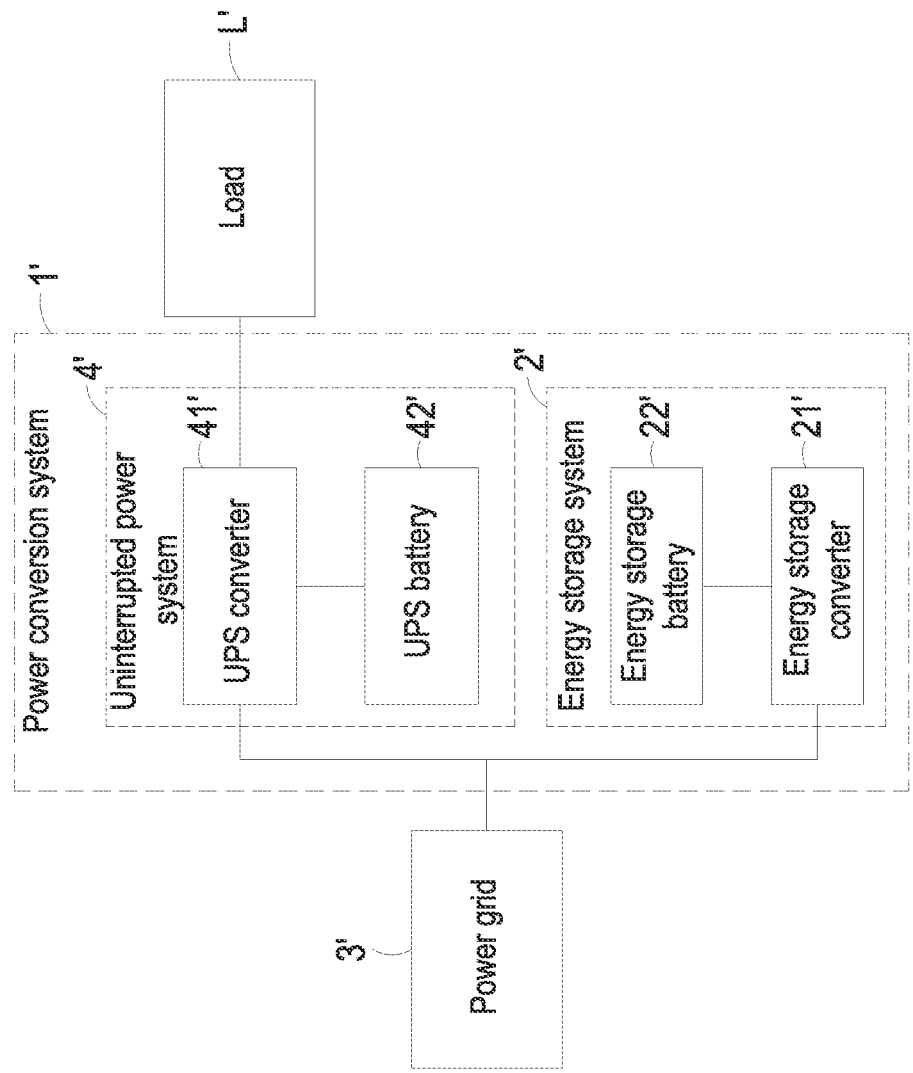
FIG. 1 is a schematic circuit block diagram illustrating a conventional power conversion system.
Figure 2:
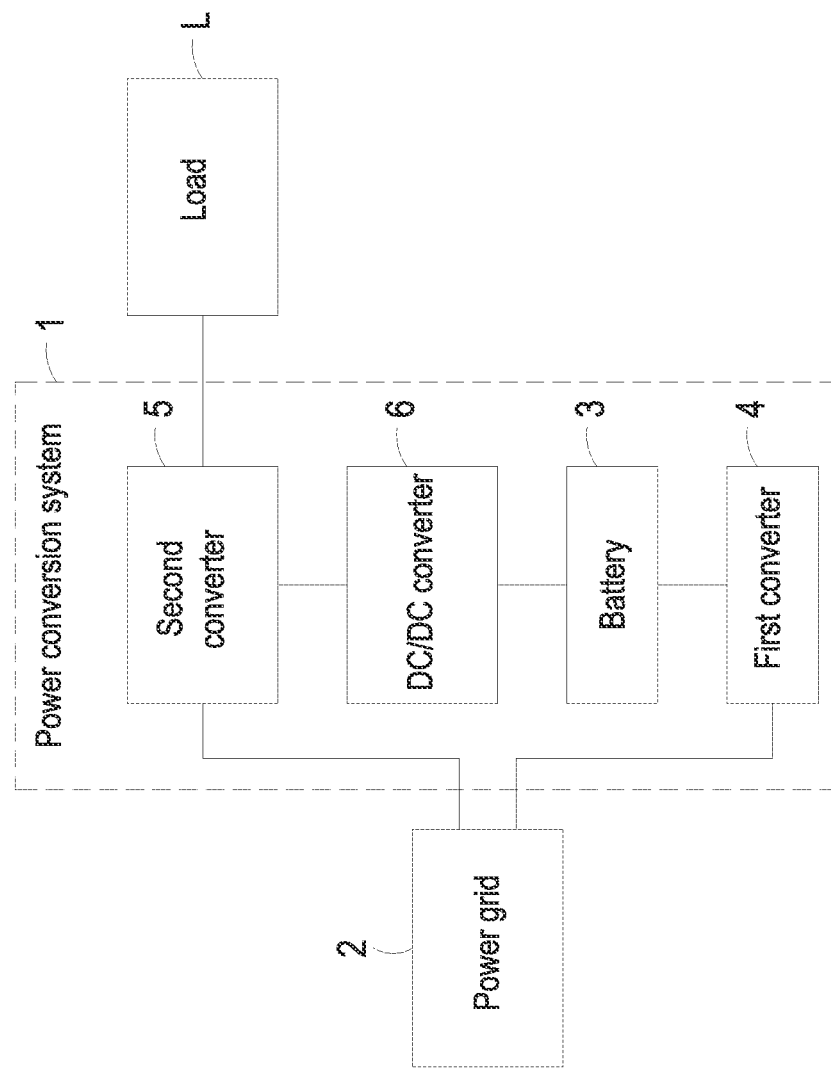
FIG. 2 is a schematic circuit block diagram illustrating a power conversion system according to a first embodiment of the present disclosure.

FIG. 2 is a schematic circuit block diagram illustrating a power conversion system according to a first embodiment of the present disclosure. As shown in FIG. 2, the power conversion system 1 is electrically connected and coupled between a power grid 2 and a load L. When the power grid 2 is operated normally, the input power from the power grid 2 is converted into an output power by the power conversion system 1, and the output power is provided to the load L. In this embodiment, the power conversion system 1 includes a battery 3, a first converter 4, a second converter 5 and a DC/DC converter 6.

The battery 3 is a rechargeable battery. The voltage of the battery 3 matches the voltage of the power grid 2. In case that the voltage of the power grid 2 is higher, the voltage of the battery 3 installed in the power conversion system 1 is higher. Whereas, in case that the voltage of the power grid 2 is lower, the voltage of the battery 3 installed in the power conversion system 1 is lower. Moreover, the battery 3 is a DC battery. In an embodiment, the voltage of the battery 3 is in the range between 1000 V and 1500 V. Preferably but not exclusively, the battery 3 is a lithium-ion battery. Generally, the lifespan of the lithium-ion battery is longer than that of the lead-acid battery. Moreover, it is not necessary to periodically replace the lithium-ion battery. Consequently, the system maintainability is enhanced.

Preferably but not exclusively, the first converter 4 is an energy storage converter. The first converter 4 is electrically connected between the power grid 2 and the battery 3. When the power grid 2 is operated normally, the first converter 4 is configured to selectively convert the input power from the power grid 2 into a first charging power. Moreover, the first charging power is provided to the battery 3 in order to charge the battery 3. In this context, the term "selectively" indicates that the power conversion is optional. When the power grid 2 is operated normally and the electric power is sufficient, the power grid 2 provides the electric power to the load L. If the battery 3 needs to be charged, the surplus electric power is converted into the first charging power by the first converter 4. When the power grid 2 is operated normally but the electric power is not sufficient, the electric power is not converted into the first charging power by the first converter 4. The term "selectively" mentioned later has the same meaning and will not be repeatedly described hereinafter.

In an embodiment, the first converter 4 is a bidirectional converter. That is, the first converter 4 can be operated in two modes. In a first operating mode, the input power from the power grid 2 is converted into the first charging power by the first converter 4, and the first charging power is provided to the battery 3. In a second operating mode, the storage power in the battery 3 is converted into a feedback power by the first converter 4, and the feedback power is fed back to the power grid 2. Consequently, the first converter 4 has the functions of serving and supporting the power grid 2. Due to the first converter 4, the active power compensation function, the reactive power compensation function, the automatic frequency adjustment function, the automatic voltage adjustment function and the dynamic grid voltage supporting function can be achieved.

Preferably but not exclusively, the second converter 5 is an uninterrupted power system (UPS) converter. The second converter 5 is directly and electrically connected between the power grid 2 and the load L. When the power grid 2 is operated normally, the second converter 5 is configured to convert the input power from the power grid 2 into the output power, and the output power is provided to the load L.

The DC/DC converter 6 is electrically connected between the battery 3 and the second converter 5. When the power grid 2 is not operated normally, the DC/DC converter 6 is configured to convert the storage power in the battery 3 into a backup power, and the backup power is provided to the second converter 5. Consequently, the voltage of the backup power from the DC/DC converter 6 matches the voltage of the second converter 5. Then, the backup power is converted into the output power by the second converter 5, and the output power is provided to the load L.

In some embodiments, when the power grid 2 is operated normally and the electric power is sufficient, the power grid 2 provides electric power to the load L. If the battery 3 needs to be charged, the surplus electric power is converted into a second charging power by the second converter 5, and the second charging power is converted to a regulated DC voltage by the DC/DC converter 6. The regulated DC voltage is provided to the battery 3 to charge the battery 3. When the power grid 2 is operated normally but the electric power is not sufficient, the electric power is not converted into the second charging power by the second converter 5.

As mentioned above, the battery 3 can be charged by the first charging power from the first converter 4 and/or the second charging power from the second converter 5. In case that the power grid 2 is abnormal and the storage power in the battery 3 is unable to be transmitted to the second converter 5, the power conversion system 1 is disabled.

From the above descriptions, the power conversion system 1 includes the single battery 3, the first converter 4 and the second converter 5. The first converter 4 is used to charge the battery 3 and implement many functions for the power grid 2, e.g., the voltage and frequency regulation, the active/reactive power compensation and the dynamic voltage supporting function. When the power grid 2 is not operated normally, the electric energy stored in the same battery 3 is converted into the output power by the second converter 5. Consequently, the function of providing the uninterrupted electric power to the load L can be achieved. Compared with the conventional power conversion system having two independent batteries in the energy storage system and the uninterrupted power system, the equipment cost and the maintenance cost of the power conversion system of the present disclosure are largely reduced. Moreover, the system maintainability is enhanced. Since the electric power from the power grid 2 is converted into the first charging power to charge the battery 3 by the first converter 4, the time period of discharging the electric power from the battery 3 is extended. Consequently, once the power grid 2 is in the abnormal condition, the power conversion system 1 can provide more sufficient backup power to the load L.

Figure 3:
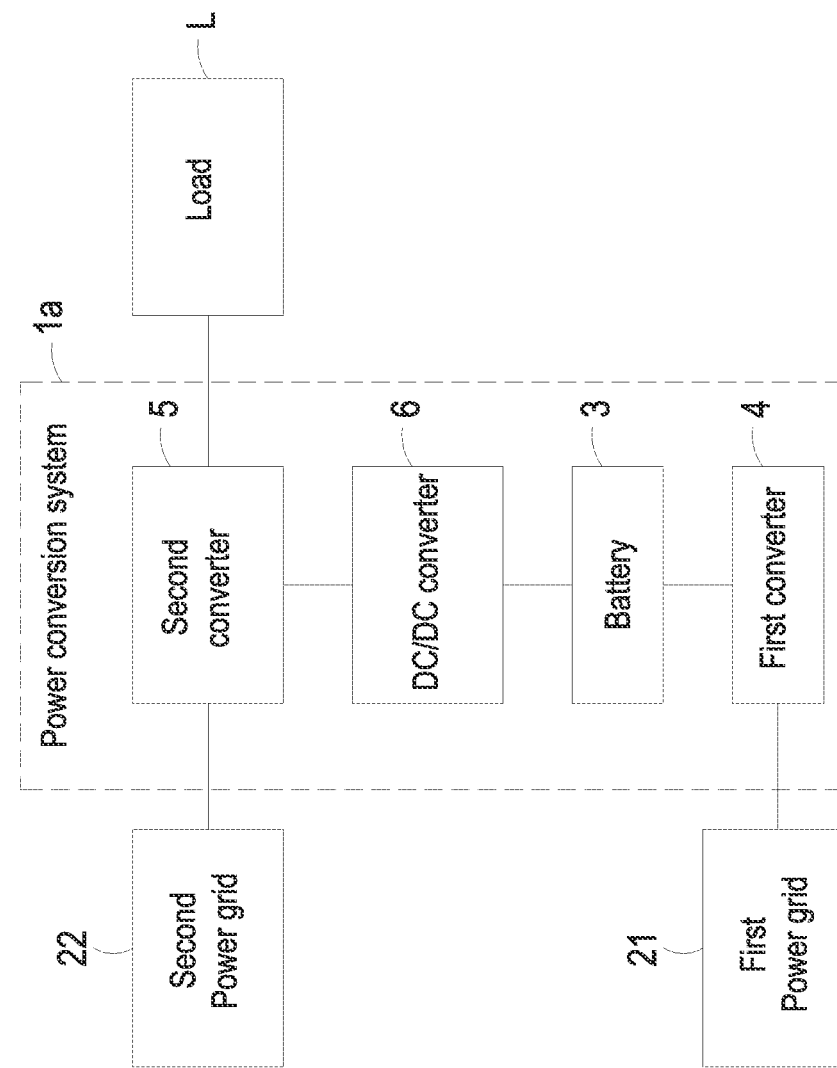
FIG. 3 is a schematic circuit block diagram illustrating a power conversion system according to a second embodiment of the present disclosure.

FIG. 3 is a schematic circuit block diagram illustrating a power conversion system according to a second embodiment of the present disclosure. As shown in FIG. 3, in this embodiment, the power conversion system 1a is connected with two power grids. The two power grids include a first power gird 21 and a second power grid 22. The voltage values (i.e., the voltage effective values or the voltage amplitudes) of the first power grid 21 and the second power grid 22 are identical or different. When the first power gird 21 is operated normally, the first power grid 21 provides a first input power. Preferably but not exclusively, the first input power is the AC power. Moreover, the voltage of the first input power is in the range between 480 Vac and 690 Vac. When the second power gird 22 is operated normally, the second power grid 22 provides a second input power. Preferably but not exclusively, the second input power is also an AC power. Moreover, the voltage of the second input power is in the range between 380 Vac and 480 Vac. In an embodiment, the voltage of the battery 3 matches the voltage of the first power grid 21. In case that the voltage of the first power grid 21 is higher, the voltage of the battery 3 installed in the power conversion system 1a is higher. Whereas, in case that the voltage of the first power grid 21 is lower, the voltage of the battery 3 installed in the power conversion system 1a is lower. Moreover, the battery 3 is a DC battery. In an example, the first input power of the first power grid 21 is an AC power with a voltage of 480 Vac, and the voltage of the battery 3 is 1000 Vdc. In another example, the first input power of the first power grid 21 is an AC power with a voltage of 690 Vac, and the voltage of the battery 3 is 1500 Vdc. Consequently, the power density and the efficiency of the power conversion system 1a are enhanced.

The first converter 4 is electrically connected between the first power grid 21 and the battery 3. When the first power grid 21 is operated normally, the first input power from the first power grid 21 is selectively converted into a first charging power by the first converter 4. Moreover, the first charging power is provided to the battery 3 in order to charge the battery 3. In an embodiment, the first converter 4 is a bidirectional converter. That is, the first converter 4 can be operated in two modes. In a first operating mode, the first input power from the first power grid 21 is converted into the first charging power by the first converter 4, and the first charging power is provided to the battery 3. In a second operating mode, the storage power in the battery 3 is converted into a feedback power, and the feedback power is fed back to the first power grid 21.

The second converter 5 is electrically connected between the second power grid 22 and the load L. When the second power grid 22 is operated normally, the second input power from the second power grid 22 is converted into the output power by the second converter 5, and the output power is provided to the load L.

The DC/DC converter 6 is electrically connected between the battery 3 and the second converter 5. When the second power grid 22 is not operated normally, the storage power in the battery 3 is converted into the backup power by the DC/DC converter 6, and the backup power is provided to the second converter 5. Consequently, the voltage of the backup power from the DC/DC converter 6 matches the voltage of the second converter 5. Then, the backup power is converted into the output power by the second converter 5, and the output power is provided to the load L.

In some embodiments, when the second power grid 22 is operated normally and the electric power is sufficient, the second power grid 22 provides electric power to the load L. If the battery 3 needs to be charged, the surplus electric power is converted into a second charging power by the second converter 5, and the second charging power is converted to a regulated DC voltage by the DC/DC converter 6. The regulated DC voltage is provided to the battery 3 to charge the battery 3. When the second power grid 22 is operated normally but the electric power is not sufficient, the electric power is not converted into the second charging power by the second converter 5.

As mentioned above, the battery 3 can be charged by the first charging power from the first converter 4 and/or the second charging power from the second converter 5. In case that one of the first power grid 21 and the second power grid 22 is abnormal, the other of the first power grid 21 and the second power grid 22 can provide the electric power to load L. Consequently, the reliability of the power conversion system 1a is enhanced.

Figure 4:
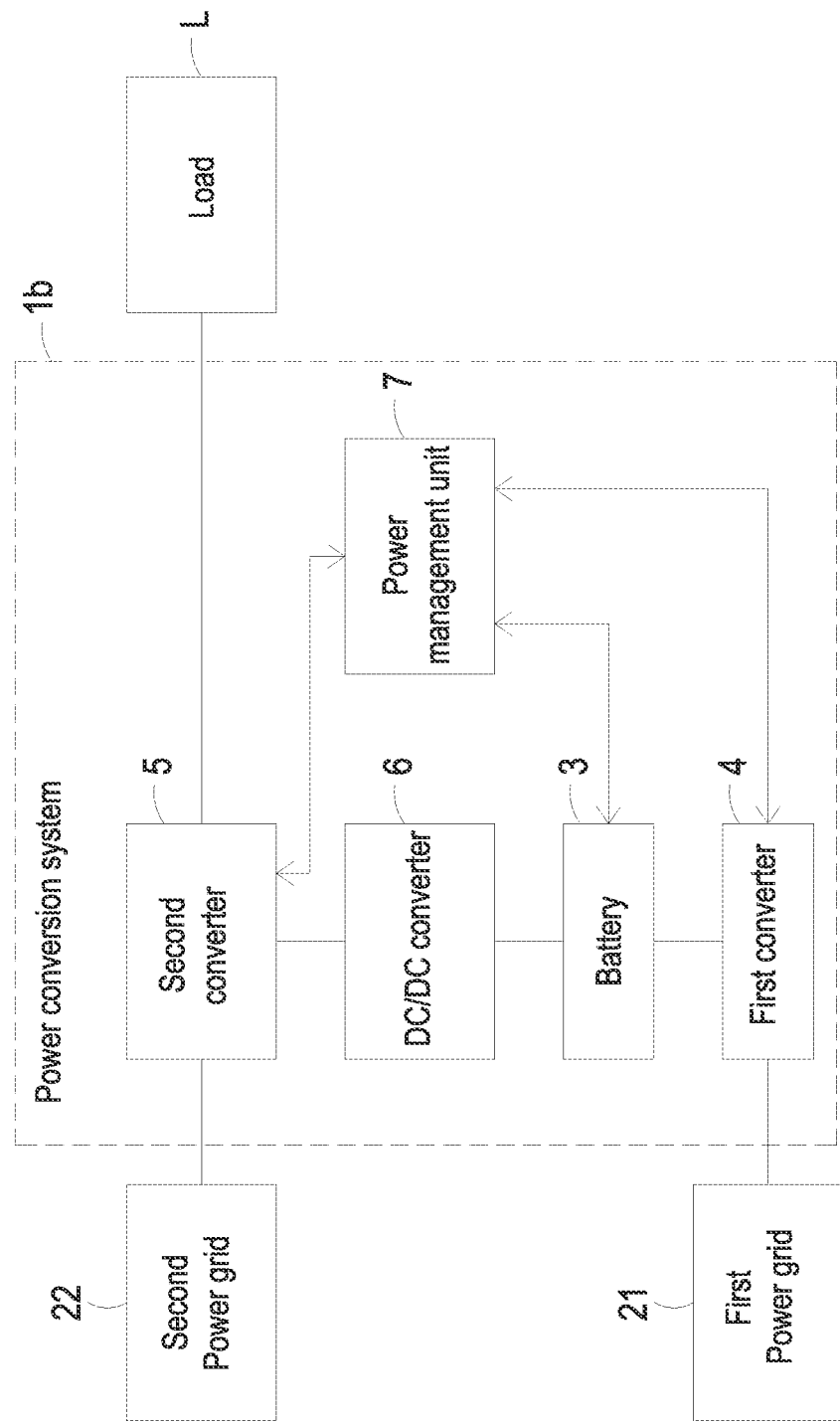
FIG. 4 is a schematic circuit block diagram illustrating a power conversion system according to a third embodiment of the present disclosure.

FIG. 4 is a schematic circuit block diagram illustrating a power conversion system according to a third embodiment of the present disclosure. In comparison with the power conversion system 1a as shown in FIG. 3, the power conversion system 1b of this embodiment further includes a power management unit 7. The power management unit 7 is coupled with the battery 3, the first converter 4 and the second converter 5. The power management unit 7 receives the information about the residual electric quantity of the battery 3. Moreover, a preset electric quantity threshold is stored in the power management unit 7. For example, the preset electric quantity threshold is 30% of the full electric quantity of the battery 3. If the power management unit 7 determines that the residual electric quantity of the battery 3 is equal to or lower than the preset electric quantity threshold, the power management unit 7 controls the first converter 4 to convert the first input power from the first power grid 21 into the first charging power. Consequently, the battery 3 is charged by the first charging power. Under this circumstance, the electric quantity of the battery 3 is maintained at a level higher than the preset electric quantity threshold.

In addition, the power management unit 7 controls the first converter 4 to selectively operate in a first mode or a second mode according to a preset conversion condition. If the conversion condition is not satisfied, the power management unit 7 controls the first converter 4 to operate in the first mode thereby converting the first input power from the first power gird 21 into the first charging power. Consequently, the battery 3 is charged by the first charging power. Whereas, if the conversion condition is satisfied, the power management unit 7 controls the first converter 4 to operate in the second mode thereby converting the storage power of the battery 3 into the feedback power, and the feedback power is provided to the first power grid 21. In other words, according to the setting of the conversion condition, the power management unit 7 controls the charge/discharge operation on the battery 3 through the first converter 4.

For example, the conversion condition is satisfied when the current time is in the daytime. If the power management unit 7 determines that the current time is not in the daytime (e.g., in the nighttime), the power management unit 7 controls the first converter to operate in the first mode thereby converting the first input power from the first power grid 21 into the first charging power, and the battery 3 is charged by the first charging power. Since the electricity price is usually lower in the nighttime, the battery 3 can be charged at a reduced cost. Whereas, if the power management unit 7 determines that the current time is in the daytime, the power management unit 7 controls the first converter to operate in the second mode thereby converting the storage power of the battery 3 into the feedback power to the first power grid 21. Since the electricity price is usually higher in the daytime, the electric power of the battery 3 can be fed back to the power grid. Under this circumstance, the profit of selling electricity is increased.

It is noted that numerous modifications and alterations may be made while retaining the teachings of the disclosure. In some other embodiments, the power management unit 7 is coupled with the DC/DC converter 6 (not shown in FIG. 4). For example, the power management unit 7 is in communication with the DC/DC converter 6. When the second power grid 22 is not operated normally, the storage power in the battery 3 is converted into the backup power by the DC/DC converter 6, and the backup power is provided to the second converter 5. Consequently, the voltage of the backup power from the DC/DC converter 6 matches the voltage of the second converter 5. Then, the backup power is converted into the output power by the second converter 5 under the control of the power management unit 7, and the output power is provided to the load L. When the second power grid 22 is operated normally, the second input power from the second power grid 22 is converted into the output power by the second converter 5 under the control of the power management unit 7, and the output power is provided to the load L.

In another embodiment, the residual electric quantity of the battery 3 is taken into consideration. For example, in a use scenario, the second power grid 22 is operated normally, and the battery 3 provides the electric power to the first power grid 21 through the first converter 4. Meanwhile, the residual electric quantity of the battery 3 is possibly lower than the preset electric quantity threshold (e.g., 30%). Under this circumstance, a portion of the second input power from the second power grid 22 is converted into the second charging power by the second converter 5 under the control of the power management unit 7, and the second charging power is converted to a regulated DC voltage by the DC/DC converter 6. The regulated DC voltage is provided to the battery 3 to charge the battery 3.

In an embodiment, the power management unit 7 further includes a display interface (not shown) and a plurality of parameter input terminals (not shown). The information about the residual electric quantity of the battery 3, the conversion condition and any other appropriate parameter of the power conversion system 1b are shown on the display interface. The information about the residual electric quantity of the battery 3, the preset electric quantity threshold, the conversion condition and any other appropriate parameter of the power conversion system 1b can be set through the parameter input terminals.

Figure 5:
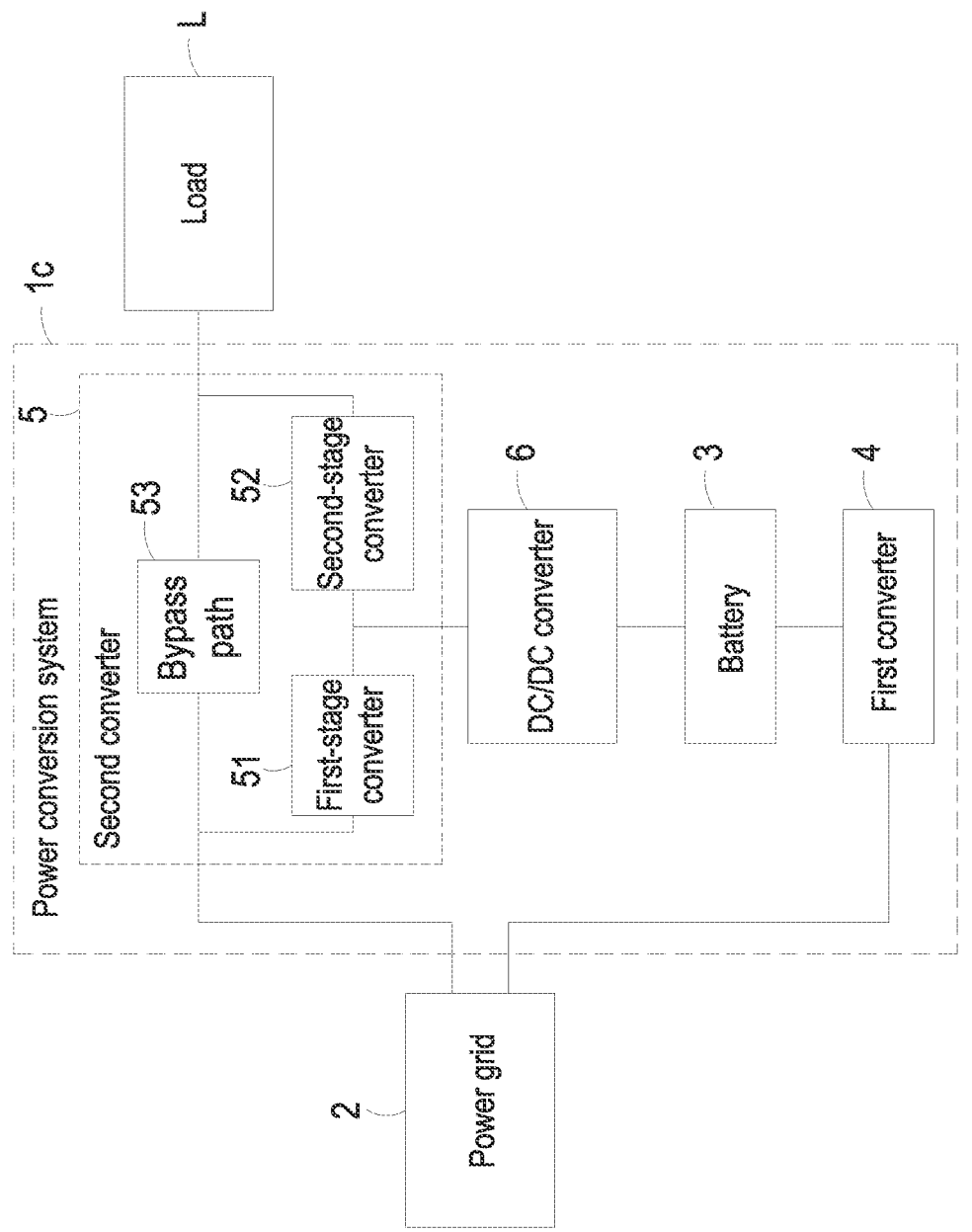
FIG. 5 is a schematic circuit block diagram illustrating a power conversion system according to a fourth embodiment of the present disclosure.

FIG. 5 is a schematic circuit block diagram illustrating a power conversion system according to a fourth embodiment of the present disclosure. Similarly, the first converter 4 is a bidirectional AC/DC converter. In comparison with the power conversion system of the above embodiments, the second converter 5 of the power conversion system 1c of this embodiment includes a conversion path and a bypass path 53. The conversion path and the bypass path 53 are connected with each other in parallel. The conversion path includes a first-stage converter 51 and a second-stage converter 52. The first-stage converter 51 is an AC/DC converter, and the second-stage converter 52 is a DC/AC converter. The AC terminal of the first-stage converter 51 and the first terminal of the bypass path 53 are electrically connected with the power grid 2. The DC terminal of the first-stage converter 51, a terminal of the DC/DC converter 6 and the DC terminal of the second-stage converter 52 are electrically connected with each other. The AC terminal of the second-stage converter 52 is electrically connected with the second terminal of the bypass path 53. Preferably but not exclusively, the bypass path 53 includes a bypass switch (not shown).

The power management unit 7 as shown in FIG. 4 may be applied to the power conversion system of this embodiment. In a variant example, the power conversion system 1c further includes a power management unit (not shown). The power management unit is coupled with the bypass path 53, the first-stage converter 51 and the second-stage converter 52. Similarly, the power management unit is also coupled with the battery 3, the first converter 4 and the DC/DC converter 6. When the power grid 2 is operated normally, the bypass switch of the bypass path 53 is turned on under the control of the power management unit, and thus the electric power from the power grid 2 is directly transferred to the load L. When the first-stage converter 51 and the second-stage converter 52 are enabled, the input power from the power grid 2 is converted into the output power by the first-stage converter 51 and the second-stage converter 52, and the output power is provided to the load L. Moreover, in case that the residual electric quantity of the battery 3 is lower than the preset electric quantity threshold, the input power from the power grid 2 is converted into a second charging power by the first-stage converter 51 of the second converter 5, and a portion of the second charging power is converted to a regulated DC voltage by the DC/DC converter 6. The regulated DC voltage is provided to the battery 3 to charge the battery 3. At the same time, another portion of the second charging power is converted into the output power by the second-stage converter 52 of the second converter 5, and the output power is provided to the load L. When the power grid 2 is not operated normally, the bypass switch of the bypass path 53 is turned off and the first-stage converter 51 is disabled under the control of the power management unit. Consequently, the storage power in the battery 3 is converted into the backup power by the DC/DC converter 6, and the backup power is provided to the second converter 5. Then, the backup power is converted into the output power by the second-stage converter 52 of the second converter 5 under the control of the power management unit, and the output power is provided to the load L. The operations of the first converter 4 controlled by the power management unit are similar to those of the power conversion system as shown in FIG. 4, and not redundantly described herein.

In another variant example, the power conversion system 1c is connected to two power grids. That is, the AC side of the first converter 4 is electrically connected to the first power grid, and the AC side of the second converter 5 is electrically connected to the second grid. The voltage values of the first power grid and the second power grid may be identical or different. The associated operations have been described as mentioned above, and are not redundantly described hereinafter.

From the above descriptions, the present disclosure provides a power conversion system. The power conversion system includes a single battery, a first converter and a second converter. The first converter can be used to charge the battery and implement many functions for the power grid, e.g., the voltage and frequency regulation, the active/reactive power compensation and the dynamic voltage supporting function. When the power grid is not operated normally, the electric energy stored in the same battery is converted into the output power by the second converter. Consequently, the function of providing the uninterrupted electric power to the load can be achieved. Compared with the conventional power conversion system having two independent batteries in the energy storage system and the uninterrupted power system, the equipment cost and the maintenance cost of the power conversion system of the present disclosure are largely reduced. Moreover, the system maintainability is enhanced. Since the electric power from the power grid is converted into the first charging power to charge the battery by the first converter, the time period of discharging the electric power from the battery is extended. Consequently, once the power grid is in the abnormal condition, the power conversion system can provide more sufficient backup power to the load.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion system coupled between a first power grid, a second power grid and a load, the power conversion system comprising:
   a battery;
   a first converter electrically connected between the first power grid and the battery, configured to selectively convert a first input power from the first power grid into a first charging power when the first power grid is operated normally; and
   a second converter electrically connected between the second power grid and the load, configured to convert a second input power from the second power grid into an output power when the second power grid is operated normally,
   wherein the battery is electrically coupled with the second converter, and a backup power from the battery is converted into the output power by the second converter when the second power grid is not operated normally, wherein the first converter is a bidirectional converter, further configured to selectively convert the storage power in the battery into a feedback power, and the feedback power is provided to the first power grid.

2. The power conversion system according to claim 1, wherein the power conversion system further comprises a DC/DC converter, and the DC/DC converter is electrically connected between the battery and the second converter, configured to convert a storage power in the battery into the backup power when the second power grid is not operated normally, and the backup power is provided to the second converter.

3. The power conversion system according to claim 2, wherein the second input power is converted into a second charging power by the second converter, the second charging power is converted into a regulated DC voltage by the DC/DC converter, and the regulated DC voltage is provided to the battery to charge the battery.

4. The power conversion system according to claim 2, wherein the power conversion system further comprises a power management unit, the power management unit is coupled with the battery, the first converter and the second converter.

5. The power conversion system according to claim 4, wherein the power management unit receives an information about a residual electric quantity of the battery, and controls the first converter to convert the first input power into the first charging power when the residual electric quantity of the battery is equal to or lower than a preset electric quantity threshold.

6. The power conversion system according to claim 4, wherein the power management unit is further coupled with the DC/DC converter.

7. The power conversion system according to claim 4, wherein when a conversion condition is not satisfied, the power management unit controls the first converter to convert the first input power into the first charging power, and the battery is charged by the first charging power; and
   when the conversion condition is satisfied, the power management unit controls the first converter to convert the storage power of the battery into a feedback power, and the feedback power is provided to the first power grid.

8. The power conversion system according to claim 7, wherein the conversion condition is related to an electricity price of the first power grid.

9. The power conversion system according to claim 2, wherein a voltage value of the first power grid and a voltage value of the second power grid are different.

10. The power conversion system according to claim 2, wherein the second converter comprises:
    an AC/DC converter, wherein an AC side of the AC/DC converter is electrically connected with the second power grid; and
    a DC/AC converter, wherein a DC side of the DC/AC converter is electrically connected with a DC side of the AC/DC converter and a terminal of the DC/DC converter, and an AC side of the DC/AC converter is electrically connected with the load.

11. The power conversion system according to claim 1, wherein when the first power grid is operated normally, the first charging power is provided to the battery, and the output power is provided to the load.

* * * * *